United States Patent
Reusser et al.

(10) Patent No.: US 6,244,424 B1
(45) Date of Patent: Jun. 12, 2001

(54) SYSTEM FOR TRANSPORTING PIECE GOODS

(75) Inventors: Andreas Reusser, Thun; Ulrich Ruchti, Steffisburg, both of (CH)

(73) Assignee: Jost AG Heimberg (CH)

( * ) Notice: Subject to any disclaimer, the term of this patent is extended or adjusted under 35 U.S.C. 154(b) by 0 days.

(21) Appl. No.: 09/247,484

(22) Filed: Feb. 9, 1999

(30) Foreign Application Priority Data

Mar. 30, 1998 (EP) .................................................. 98810277

(51) Int. Cl.[7] .................................................. B65G 11/10
(52) U.S. Cl. .................................................. 198/560
(58) Field of Search .................................... 198/560, 781.1, 198/688.1, 40; 209/900

(56) References Cited

U.S. PATENT DOCUMENTS

| | | | | |
|---|---|---|---|---|
| 3,586,154 | * | 6/1971 | Schultz | 198/139 |
| 3,696,912 | * | 10/1972 | Fleischauer et al. | 198/127 |
| 3,957,630 | * | 5/1976 | Mooradian | 209/136 |
| 4,116,327 | * | 9/1978 | Eglinton et al. | 198/560 |
| 4,785,942 | * | 11/1988 | Van Leijenhorst et al. | 209/657 |
| 4,860,822 | * | 8/1989 | Maeda et al. | 198/458 |
| 5,042,644 | * | 8/1991 | Davis | 198/781 |
| 5,226,547 | * | 7/1993 | Malatesta | 209/657 |
| 5,655,667 | * | 8/1997 | Isaacs | 209/539 |

FOREIGN PATENT DOCUMENTS

| 703265 | 3/1941 | (DE) . |
|---|---|---|
| 4309038 | 3/1994 | (DE) . |

\* cited by examiner

Primary Examiner—Christopher P. Ellis
Assistant Examiner—Rashmi Sharma
(74) Attorney, Agent, or Firm—Ostrolenk, Faber, Gerb & Soffen, LLP

(57) ABSTRACT

A system for transporting piece goods which comprises at least one output track for conveying piece goods from an entrance to an exit, the entrance being at a higher level than the exit. In order to prevent damages of the transported piece goods and to obtain a better utilization of the transport capacity of the system, the latter is characterized in that the at least one output track is disposed between the entrance and the exit, and in that the output track includes at least two sections in its longitudinal direction which have different adhesive properties and form different angles with respect to a horizontal plane.

17 Claims, 4 Drawing Sheets

SYSTEM FOR TRANSPORTING PIECE GOODS

BACKGROUND OF THE INVENTION

The invention relates to a system for transporting piece goods, said system including at least one output track by which piece goods are conveyed from an entrance to an exit, said entrance being at a higher level than said exit.

More particularly, the invention related to a system for transporting parcels in a parcel distribution center where the weight of the parcels and the adhesive properties of their surfaces may vary in a wide range and where the parcels are not only transported, but also slowed down and stacked.

Conventional systems of the above-mentioned kind include output tracks which are mostly composed of metal or wooden chutes comprising sections having different slopes. These output tracks are disadvantageous in that some parcels slide down slide too fast and others too slow or not at all, the sliding speed of a parcel depending upon its weight and the adhesive properties of its outer surface. The undesirable consequences of quite different sliding speeds of the parcels are parcel collisions and the resulting damages, on one hand, and a poor utilization of the transport capacity of the chutes, on the other hand. In the latter case, some sections of the chutes are almost empty, and others are congested. Parcels which do not slide remain in the upper section of an output track and must be retrieved by the personnel.

SUMMARY OF THE INVENTION

As an aim of the invention is therefore to provide a system of the above-mentioned kind which makes it possible to eliminate the above-mentioned drawbacks and which thereby prevents excessive pressure on the goods that can be caused by congestion of piece goods at the lower end of an output track.

According to the invention, this aim is attained by a system for transporting piece goods wherein said output track includes at least two sections in the longitudinal direction, said sections having different adhesive properties and having upper surfaces which form different angles with a horizontal plane.

The particular advantages of a system according to the invention are that it provides:

- a soft deceleration of piece goods having different weights and sliding properties as they enter into the output track, and
- transport of piece goods in the output track at a uniform speed.

The piece goods are thus softly decelerated along the output track, and pressure which may be exerted on the goods by congestion thereof at the lower end of the output track is reduced. Therefore, a system according to the invention prevents the above-mentioned parcel collisions and makes possible a better utilization of the transport capacity of the system. These advantageous effects are also obtained when the system for transporting goods according to the invention is used for transporting piece goods whose weight and sliding properties are homogenous.

Preferred embodiments of a system according to the invention are defined by the dependent claims.

BRIEF DESCRIPTION OF THE DRAWINGS

Preferred embodiments of a system according to the invention are described hereinafter as examples with reference to the accompanying figures.

In the context of the invention described hereinafter, an output track conveys piece goods over a transport distance from an entrance to an exit.

Figure 1:
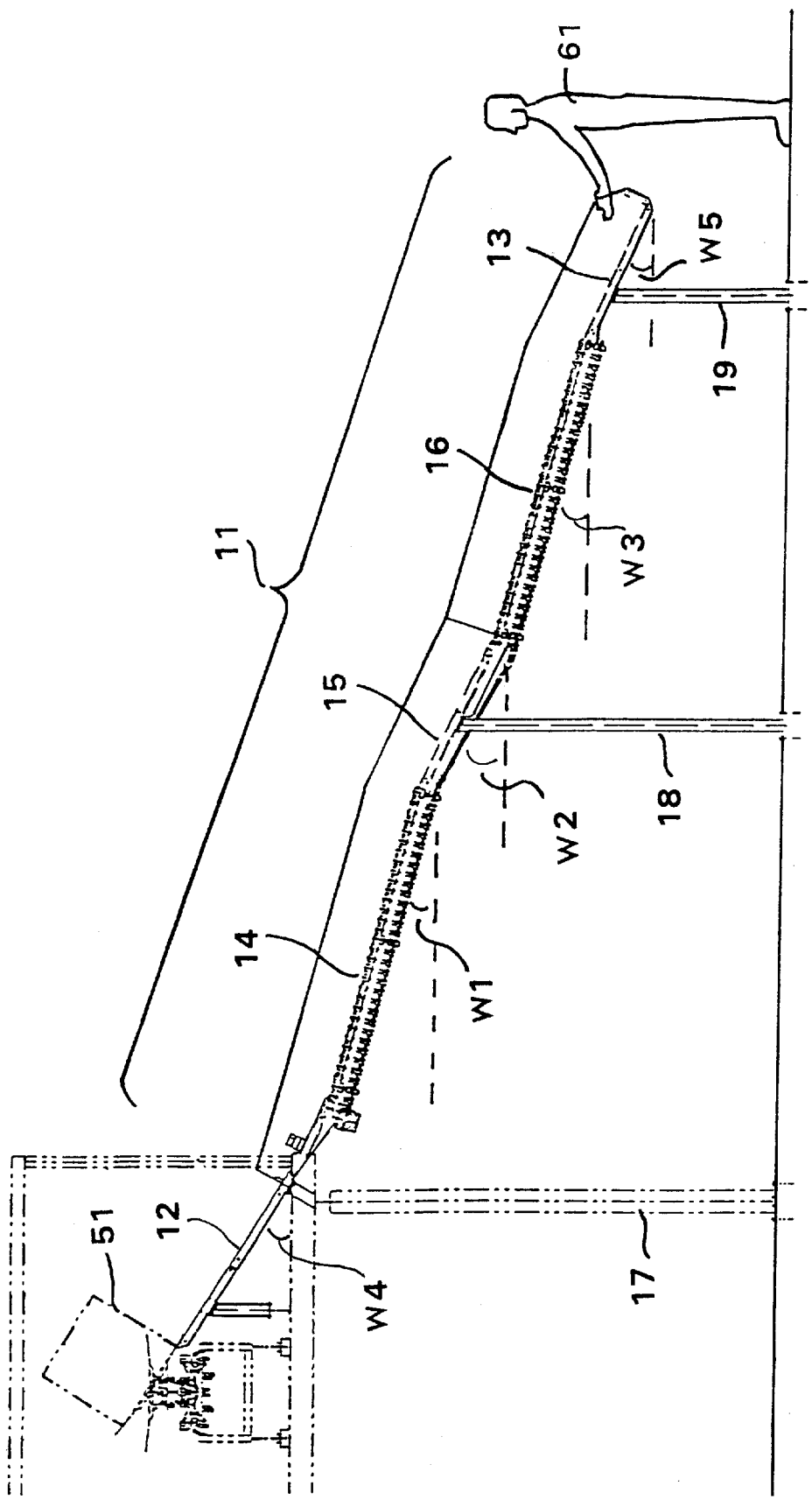
FIG. 1 shows a schematic side view of a system according to the invention including an output track 11.
Figure 2:
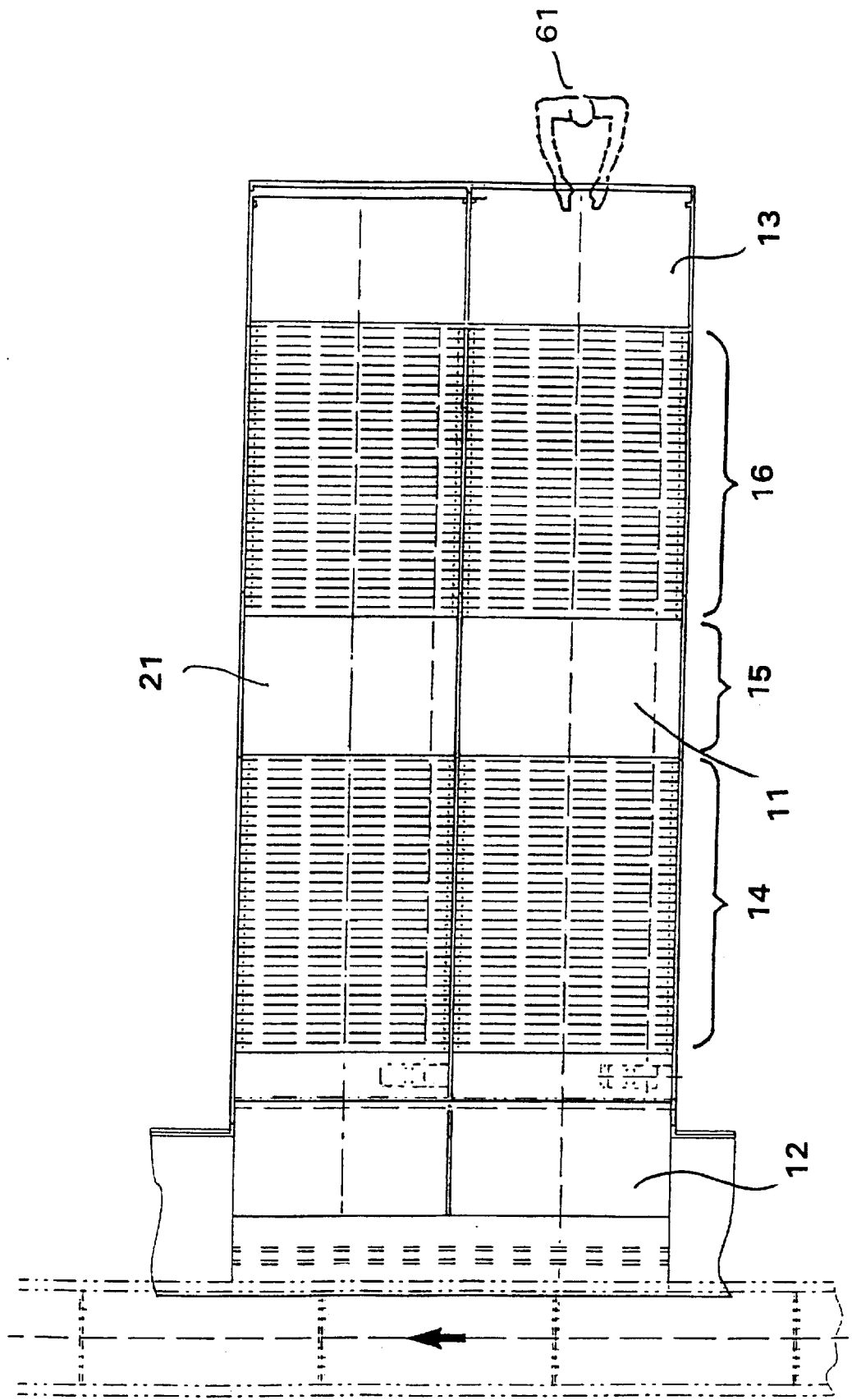
FIG. 2 shows schematically a top view of the system shown by FIG. 1 including an output track 11 and an adjacent output track 12 of the same kind.

As shown in FIGS. 1 and 2, a system according to the invention comprises at least one output track 11 for conveying piece goods, e.g. of a parcel 51, from an entrance 12 to an exit 13 where the goods are collected and removed e.g. by a person 61. Entrance 12 is at a higher level than exit 13. Output track 11 is mounted on supports 17, 18, 19.

In order to simplify the representation, only one parcel 51 is illustrated in FIG. 1 as an example of a piece good.

However, in a typical application of a system according to the invention, a plurality of such parcels are transported. Such parcels are supplied by a transport system, e.g. a wagon on rails, which is not further described herein, and deposited at the entrance 12 e.g. by tilting the loading surface of the wagon.

Output track 11 lies and extends between entrance 12 and exit 13. As shown in FIGS. 1 and 2, output track 11 comprises at least two partial sections 14 and 15, respectively 15 and 16, in its longitudinal direction. These sections have different adhesive properties and have upper surfaces which are disposed at different angles W1, W2 respectively W2, W3 with respect to a horizontal plane.

In a preferred embodiment, a system according to the invention comprises at least one output track 11 which includes three partial sections in its longitudinal direction. The first partial section is a first roller conveyor 14. The third partial section is a second roller conveyor 16. The second partial section is a simple chute 15 which is disposed between the first roller conveyor 14 and the second roller conveyor 16 and whose continuous upper surface lies in one plane. The adhesive properties of roller conveyors 14 and 16 are different from the adhesive properties of simple chute 15. The upper contact surfaces of roller conveyors 14, 16 are disposed at respective angles W1 and W3 with respect to a horizontal plane which are smaller than the angle W2 formed by simple chute 15 and the horizontal plane. Simple chute 15 is e.g. a metal slide. In addition to the described properties and independently of possible differences in the speeds of the roller conveyors, chute 15, which forms the junction between first roller conveyor 14 and second roller conveyor 16, brings about the substantial reduction of a pressure on the piece goods that may be caused by congestion of piece goods at exit 13.

In a preferred embodiment of a system according to the invention, one of roller conveyors 14 or 16 or both roller conveyors 14 and 16 comprise rollers whose surfaces have different adhesive properties.

Figure 3:
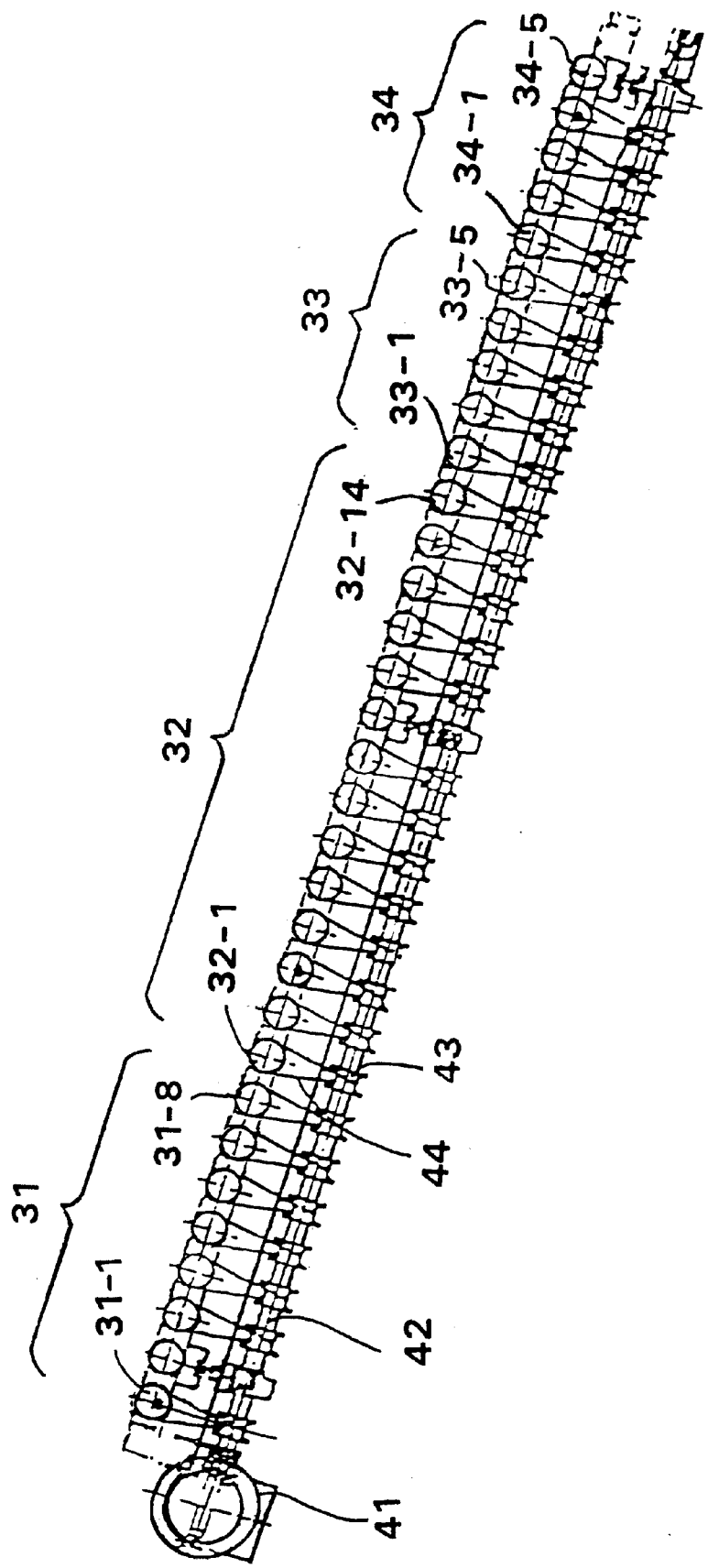
FIG. 3 shows an enlarged representation of roller conveyor 14 of the system shown in FIGS. 1 and 2.

Such a roller conveyor 14 is e.g. illustrated in FIG. 3. As shown in this figure, roller conveyor 14 comprises groups 31, 32, 33, 34 of adjacent but spaced rollers. Adjoining groups, e.g. 31 and 32, 32 and 33, or 33 and 34, have different adhesive properties. Preferably, this applies to roller conveyor 16 as well.

Another preferred property of roller conveyors 14 and 16, or at least of one of roller conveyors 14 and 16, is that it comprises at least one group of adjacent but spaced rollers, e.g. group 31, the group being exclusively composed of rollers 31-1 to 31-8 which have the same adhesive properties. For example, groups 31 and 34 are exclusively composed of rollers having a smooth steel surface, and for example group 33 is exclusively composed of rollers which are provided with a rubber surface.

Another preferred property of roller conveyors 14 and 16, or of at least one of roller conveyors 14 and 16 is that it comprises at least one group, e.g. group 32, of adjacent but spaced rollers 32-1, 32-2, . . . , 32n, 32 (n+1), . . . , the surfaces of adjoining rollers, e.g. of rollers 32n and 32(n+1), having different adhesive properties. In a preferred alternative of this embodiment, group 32 alternately comprises rollers provided with a steel surface and rollers provided with a rubber surface.

In a preferred embodiment of a system according to the invention, simple chute 15 is disposed at an angle with respect to a horizontal plane which is comprised between 15° and 40° while roller conveyors 14 respectively 16 are disposed at an angle with respect to a horizontal plane which is comprised between 0° and 25°.

In an especially preferred embodiment of a system according to the invention, simple chute 15 is disposed at an angle with respect to a horizontal plane which is comprised between 20° and 30° while roller conveyors 14 respectively 16 are disposed at an angle with respect to a horizontal plane which is comprised between 10° and 20°.

In an even more preferred embodiment of a system according to the invention, simple chute 15 is disposed at an angle with respect to a horizontal plane which is comprised between 23° and 27° while roller conveyors 14 respectively 16 are disposed at an angle with respect to a horizontal plane which is comprised between 13° and 17°.

Entrance 12 is preferably provided with a continuous upper surface extending in a single plane which is disposed at an angle W4 with respect to a horizontal plane which is preferably greater than angle W1 and W3 between roller conveyor 14 and roller conveyor 16 and the horizontal plane respectively.

The angles shown in FIG. 1 have the following preferred values W1=15°, W2=25°, W3=15°, W4=30°, W5=25°.

Figure 4:
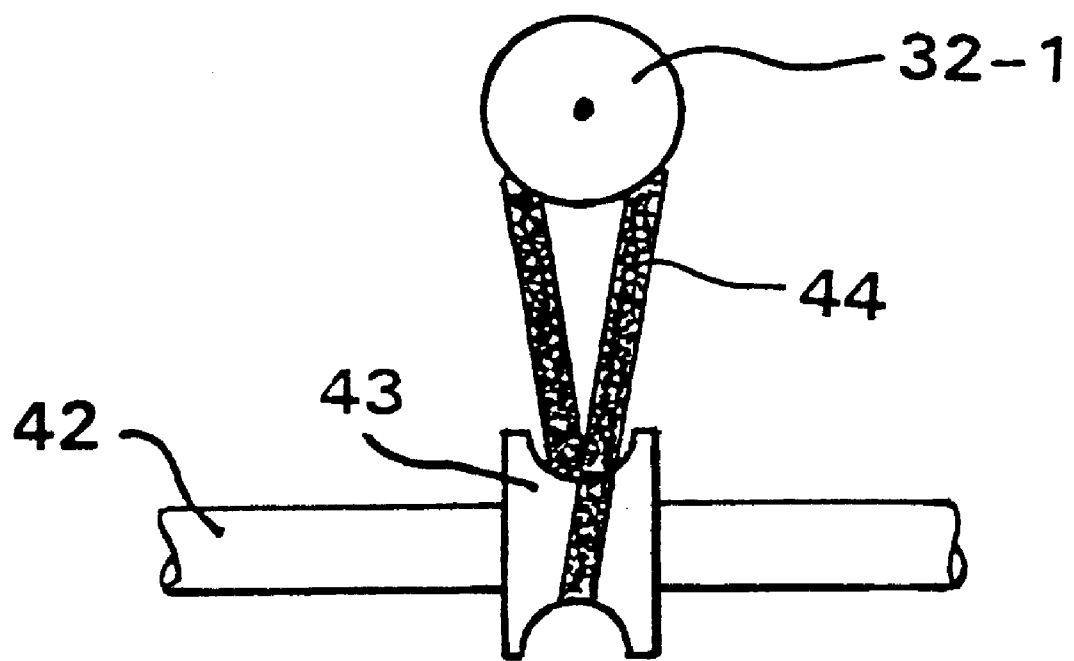
FIG. 4 shows an enlarged representation of the driving means which provide a rotational movement of the individual rollers of the roller conveyor of FIG. 3.

In a preferred embodiment of a system according to the invention, at least some of the rollers of at least one of roller conveyors 14, 16 are driven by driving means which comprise a motor 41, a shaft 42, friction wheels 43 and belts 44, as shown in FIG. 3. As an example of the half-crossed belt drive of a single roller 32-1, FIG. 4 shows an enlarged illustration of the driving means producing a rotational movement of one of the rollers of roller conveyor 14 according to FIG. 3. This belt drive is so dimensioned that individual rollers may be blocked by parcels or other piece goods thereon without impairing the drive of the other rollers.

The above-described drive results in an average speed of the transported goods 51 which is comprised between 0.1 and 0.5 meters per second.

In another preferred embodiment of a system according to the invention, at least one of roller conveyors 14, 16 or each one of roller conveyors 14, 16 comprises rollers which are driven at different speeds.

In all above-described embodiments, a soft deceleration and a uniform transport speed of the goods as well as a reduced stemming pressure in exit 13 is obtained particularly by the application of the described roller conveyors.

What is claimed is:

1. A system for transporting piece goods, said system comprising:
   at least one output track by which the goods are conveyed from an entrance to an exit, said entrance being at a higher level than said exit, wherein:
      said output track includes three sections in a longitudinal direction, said sections having different adhesive properties and having upper surfaces which form different angles with a horizontal plane,
      said first section is a first roller conveyor,
      said third section is a second roller conveyor,
      said second section is a simple chute having a continuous upper surface extending in a single plane,
      said chute is disposed between said first roller conveyor and said second roller conveyor,
      said adhesive properties of said roller conveyors are different from said adhesive properties of said simple chute, and
      said upper surface of each one of said roller conveyors is disposed at an angle with respect to a horizontal plane which is smaller than an angle between said simple chute and the horizontal plane.

2. The system of claim 1, wherein at least one of said roller conveyors comprises rollers whose surfaces have different adhesive properties.

3. The system of claim 2, wherein said at least one roller conveyor comprises groups of adjacent but spaced rollers, adjoining groups of which have different adhesive properties.

4. The system of claim 2, wherein said at least one roller conveyor comprises at least one group of adjacent but spaced rollers, said group being exclusively composed of rollers having the same adhesive properties.

5. The system of claim 2, wherein said at least one roller conveyor comprises at least one group of adjacent but spaced rollers, the surfaces of adjoining rollers having different adhesive properties.

6. The system of claim 2, wherein said at least one roller conveyor comprises rollers whose surface is made of steel as well as rollers whose surface is made of rubber.

7. The system of claim 1, wherein the upper surface of said simple chute is disposed at an angle with respect to a horizontal plane which is between 15° and 40°.

8. The system of claim 1, wherein the upper surface of said simple chute is disposed at an angle with respect to a horizontal plane which is between 20° and 30°.

9. The system of claim 1, wherein the upper surface of said simple chute is disposed at an angle with respect to a horizontal plane which is between 23° and 27°.

10. The system of claim 1, wherein the upper surface of said at least one roller conveyor or each one of said roller conveyors is disposed at an angle with respect to a horizontal plane which is between 0° and 25°.

11. The system of claim 1, wherein the upper surface of said at least one roller conveyor or each one of said roller conveyors is disposed at an angle with respect to a horizontal plane which is between 10° and 20°.

12. The system of claim 1, wherein the upper surface of said at least one roller conveyor or each one of said roller conveyors is disposed at an angle with respect to a horizontal plane which is between 13° and 17°.

13. The system of claim 1, wherein said simple chute is a metal slide.

14. The system of claim 1, wherein said entrance comprises a continuous upper surface extending in a plane which forms an angle with respect to a horizontal plane which is greater than the angle formed between said at least one roller conveyor or each one of said roller conveyors and the horizontal plane.

15. The system of claim 1, wherein said exit comprises a continuous upper surface extending in a plane which forms an angle with respect to a horizontal plane which is greater than the angle between said at least one roller conveyor or each one of said roller conveyors and the horizontal plane.

16. The system of claim 1, wherein at least some of the rollers of said at least one roller conveyor are driven by a motor which produces an average speed of the transported goods which is between 0.1 and 0.5 meters per second.

17. The system of claim 1, wherein said at least one roller conveyor or each one of said roller conveyors comprises rollers which are driven at different speeds.

* * * * *